United States Patent [19]
Sheaffer et al.

[11] Patent Number: 5,790,822
[45] Date of Patent: Aug. 4, 1998

[54] METHOD AND APPARATUS FOR PROVIDING A RE-ORDERED INSTRUCTION CACHE IN A PIPELINED MICROPROCESSOR

[75] Inventors: Gad S. Sheaffer; Ronny Ronen, both of Haifa, Israel

[73] Assignee: Intel Corporation, Santa Clara, Calif.

[21] Appl. No.: 621,136

[22] Filed: Mar. 21, 1996

[51] Int. Cl.⁶ .................................. G06F 9/30; G06F 9/38
[52] U.S. Cl. .................. 395/380; 395/376; 395/390; 395/392; 395/393; 395/800.23; 395/800.24; 395/800.41; 395/800.42
[58] Field of Search .......................... 395/800, 380–382, 395/390–391, 393, 394, 376, 392, 800.23–800.27, 800.41, 800.42

[56] References Cited

U.S. PATENT DOCUMENTS

| | | | |
|---|---|---|---|
| 5,500,943 | 3/1996 | Ho et al. | 395/394 |
| 5,517,657 | 5/1996 | Rodgers et al. | 395/800 |
| 5,530,933 | 6/1996 | Frink et al. | 395/403 |
| 5,574,871 | 11/1996 | Host et al. | 395/376 |
| 5,584,038 | 12/1996 | Papworth et al. | 395/800 |
| 5,625,788 | 4/1997 | Boggs et al. | 395/390 |
| 5,632,023 | 5/1997 | White et al. | 395/394 |
| 5,636,374 | 6/1997 | Rodgers et al. | 395/571 |
| 5,649,225 | 7/1997 | White et al. | 395/800.23 |

*Primary Examiner*—Parshotam S. Lall
*Assistant Examiner*—Bharat Barot
*Attorney, Agent, or Firm*—Blakely, Sokoloff, Taylor & Zafman

[57] ABSTRACT

A method and apparatus for executing instructions in a pipelined microprocessor. The method includes re-ordering the set of instructions prior to loading the instructions into an instruction cache. In one embodiment, a re-ordering unit receives the set of instructions as a trace segment made of a set of basic blocks of instructions in a logical order of execution. After being re-ordered, the instructions are presented to the reordered instruction cache in bundles. When an instruction is unavailable, possibly due to an unresolved data dependency, no operation codes (nops) are inserted into the bundle in place of an in place of an instruction, creating fixed length bundles. In a second embodiment, nops are not used. Variable length bundles are produced by using an additional bit(s) per instruction to mark the end of the bundles.

29 Claims, 3 Drawing Sheets

METHOD AND APPARATUS FOR PROVIDING A RE-ORDERED INSTRUCTION CACHE IN A PIPELINED MICROPROCESSOR

BACKGROUND OF THE INVENTION

1. Field of the Invention

The invention relates to computer systems, and in particular, to microprocessors.

2. Description of Related Art

Modern microprocessors implement a variety of techniques to increase the performance of executing instructions, including superscalar, pipelining, out-of-order, and speculative execution. More specifically, superscalar microprocessors are capable of processing multiple instructions within a common clock cycle. Pipelined microprocessors divide the processing (from fetch to retirement) of an operation into separate pipestages and overlap the pipestage processing of subsequent instructions in an attempt to achieve single pipestage throughput performance.

Speculative execution of instructions by a microprocessor involves the microprocessor making a branch prediction of a particular program pathway given a particular branch condition. By predicting a given branch pathway, the front end of the microprocessor may process instructions while keeping the pipeline full of information before the actual branch is resolved. Provided the prediction was accurate, the microprocessor receives a large performance gain by maintaining the pipeline full of information before the branch is resolved. However, until it is known that the correct program path was taken, the information processed by the microprocessor from the branch point forward is called "speculative" information. If the checking logic of the microprocessor determines that the microprocessor mispredicted, the speculative information must be purged and the pipeline restarted at the correct program pathway.

Out-of-order processing within a microprocessor involves allowing instructions to be processed out of their original program order to gain performance and increase parallelism and efficient resource usage. True data dependent instructions are not executed out-of-order, but often many instructions within a program order do not directly depend on the results of earlier instructions. These instructions may be processed out-of-order if the microprocessor contains sufficient resources.

The more aggressive the implementation of a superscalar processor, out of order, pipelined microprocessor, the more manipulations that have to be applied to each instruction as they are passed down the pipestages of the processor.

Manipulating the instructions in the pipestages between the instruction cache and the execution unit, however, unnecessarily couples the execution throughput to the throughput at which these manipulations can be performed. If, however, the manipulations were performed once and captured in an instruction cache prior to the pipestages, it would enable performing the manipulations at a reduced throughput, wherein fewer instructions would be manipulated per processor cycle. The increased time required to perform the manipulation would then be amortized over multiple executions.

Most of the instruction manipulations performed in the pipeline (besides the execution itself) grow quadratically in complexity with the width of the machine. For example, the amount of logic required to simultaneously manipulate 2 instructions is 4 times the amount required to handle just one instruction per cycle. This complexity translates into both increased die area requirements and timing, making the design of very wide superscalar processors, using conventional microarchitectures, very difficult.

In addition, separating the complex instruction manipulations into a large number of pipestages results in higher penalties for branch mispredictions. Every time instructions are fetched from the instruction cache, the instructions must be processed through the pipestages between the instruction cache and the execution unit. Therefore, it takes more time to detect a branch misprediction. Since all the instructions following a branch have to be discarded if the branch was incorrectly predicted, the more stages between the instruction fetch and execute, the more cycles it takes to detect the misprediction. These cycles are time that the processor did not correctly execute instructions, resulting in reduced overall performance.

Therefore, a need exist for performing complex manipulations of the instructions once and capturing the results in the instruction cache of a pipelined processor. As a result, the efforts of the manipulation can be used over and over again, thereby reducing the total number of manipulation operations performed during the processing of each instruction.

One of the most complex manipulations performed in a pipelined processor involves re-ordering the instructions so that the instructions can be executed more efficiently in a processor having a given set of execution resources. More specifically, instructions can be re-ordered so that the scheduler will be able to easily pick instructions for execution that have no data dependencies among them and/or do not compete for the same execution resource.

Performing the re-ordering of instructions before they are stored in the instruction cache in the pipelined processor, however, could present a number of additional benefits. For example, it would enable re-ordering out of a larger window of instructions. The start of the re-ordering activity may be deferred until a larger number of instructions has been accumulated. A larger instruction window increases the parallelism because a larger selection of instructions to re-order increases the quality of the re-ordering activity and the resulting schedule.

In addition, various priority schemes could be employed to the instruction stream. For example, instructions on the longest dependency chains of the program could be advanced, without violating data dependencies, relative to instructions not on the critical execution paths.

As such, an additional need exists for a method and apparatus that eliminates pipelined stages in a pipelined processor by re-ordering the instructions prior to loading the instruction cache, so as to increase processing speed and to more effectively and efficiently utilize execution resources.

SUMMARY OF THE INVENTION

The present invention includes an apparatus and computer implemented method of executing instructions in a pipelined microprocessor. The steps of the method, which are performed by the apparatus, include fetching a set of instructions in-order. In a second step, re-ordering the set of instructions. In a third step, loading the set of instructions into a re-ordered instruction cache. In a fourth step, issuing the set of instructions from the re-ordered instruction cache to an execution pipeline of a pipelined processor.

DETAILED DESCRIPTION

The present invention is an apparatus and method eliminating pipestages in a processor by re-ordering instructions prior to loading an instruction cache so as to increase processing speed and consumption of resources. In the following detailed description of the present invention numerous specific details are set forth in order to provide a thorough understanding of the present invention. However, it will be obvious to one skilled in the art that the present invention may be practiced without these specific details. In other instances, well-known structures and devices are shown in block diagram form, rather than in detail, in order to avoid unnecessarily obscuring aspects of the present invention.

Figure 1:
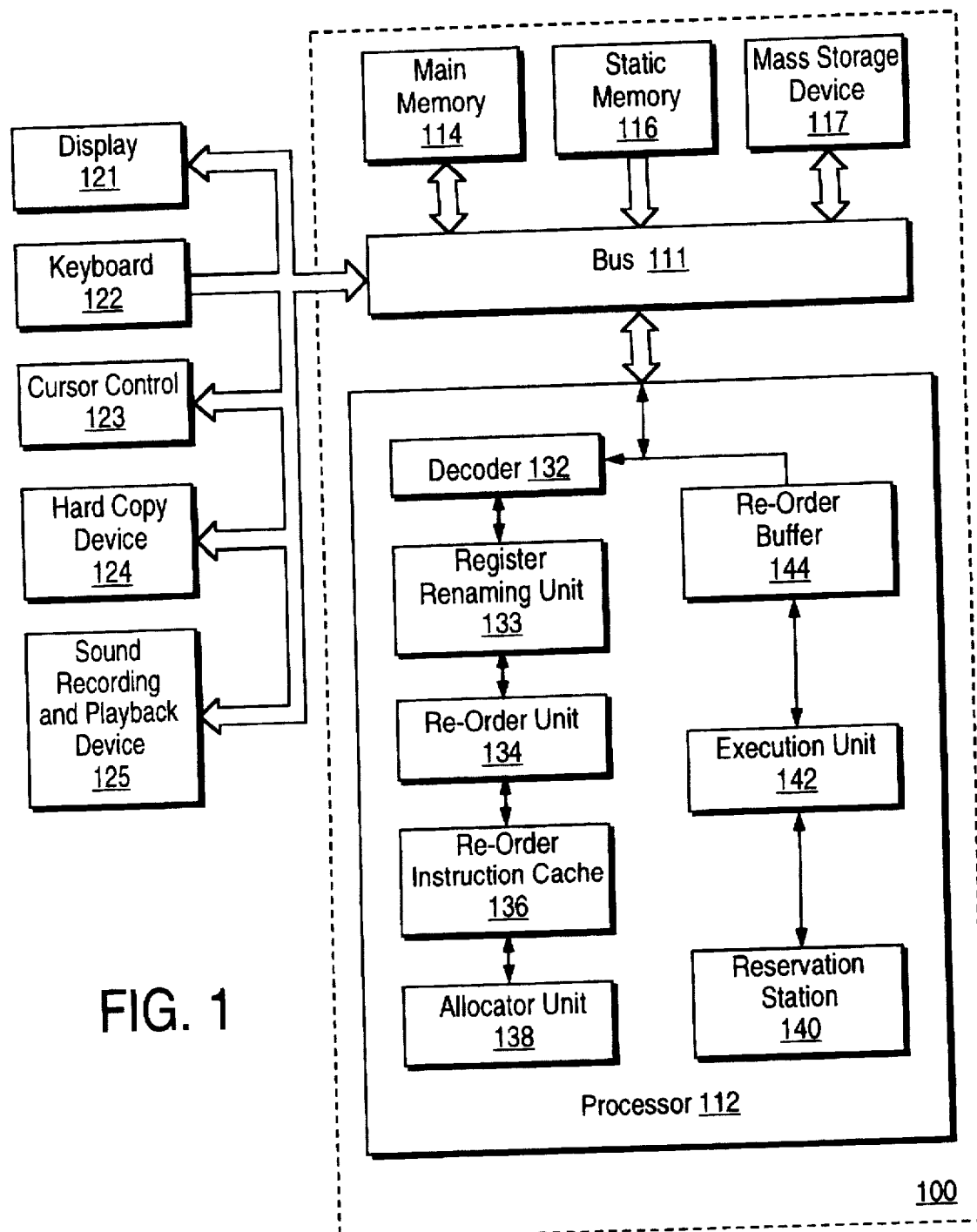
FIG. 1 illustrates a computer system having one embodiment of the present invention.

FIG. 1 illustrates a computer system 100 upon which the present invention can be implemented. Computer system 100 comprises an address/data bus or other communication mechanism 111 for communicating information, and a processor 112 coupled with bus 111 for executing instructions and processing information. Processor 112 may be implemented using silicon or gallium arsenide. System 100 further comprises a random access memory (RAM) or other dynamic storage device 114 (referred to as main memory), coupled to bus 111 for storing information and instructions to be executed by processor 112. Main memory 114 also may be used for storing temporary variables or other intermediate information during execution of instructions by processor 112. Computer system 100 also comprises a read only memory (ROM) and/or other static storage device 116 coupled to bus 111 for storing static information and instructions for processor 112, and a data storage device 117 such as a magnetic disk or optical disk and its corresponding disk drive.

Computer system 100 may further be coupled to a display device 121, such as a cathode ray tube (CRT) or liquid crystal display (LCD) coupled to bus 111 for displaying information to a computer user. An alphanumeric input device 122, including alphanumeric and other keys, may also be coupled to bus 111 for communicating information and command selections to processor 112. An additional user input device is cursor control 123, such as a mouse, a trackball, stylus, or cursor direction keys, are coupled to bus 111 for communicating direction information and command selections to processor 112, and for controlling cursor movement on display 111. Another device which may be coupled to bus 111 is hard copy device 124 which may be used for printing instructions, data, or other information on a medium such as paper, film, or similar types of media. Furthermore, a sound recording and playback device 125, such as a speaker and microphone may optionally be coupled to bus 111 for interfacing with computer system 100.

Further illustrated in FIG. 1 are the units of the processor 112 which are executed in a pipelined process. Instructions are initially received from one of the memory devices into the decoder unit 132. The decoding unit decodes each instruction into a set of micro-operation (uops). The instructions are then transferred to the register renaming unit 133. The register renaming unit 133 renames the instruction's architectural registers to logical registers. By renaming the registers used by the instructions to a larger set of logical registers, false data dependencies between instructions may be removed allowing additional parallel execution of instructions.

The instructions are then transferred to the re-order unit 134. The re-order unit re-orders the instructions so that a scheduler will be able to easily pick instructions for execution that have no data dependencies among them and/or do not compete for the same execution resources. One embodiment of the re-order unit 134 and the logic implemented by the re-order unit 134 is discussed in more detail in the section on the RE-ORDER UNIT.

After having been re-ordered, the instructions are loaded into the re-ordered instruction cache 134. Re-ordering the instructions prior to the instruction cache 134 reduces the throughput of the re-ordered instructions, lowers the penalties of mispredictions, and improves the re-ordering of the instructions.

From the re-ordered instruction cache 134, the re-ordered instructions are repeatedly fetched and passed down an execution pipeline. A first stage consist of the allocator unit 138. The allocator 138 assigns the results of each incoming instruction to a location (entry) in a re-order buffer (ROB) 144, wherein the logical destination address (LDST) of the instructions are mapped to a corresponding physical destination address (Pdst) in the ROB 144. A register alias table (RAT) maintains this mapping.

In a second stage, the instructions are sent to the Reservation Station unit 140 (RS). During the second stage, instructions within the RS 140 that are pending execution are made ready and scheduled for execution. The scheduled instructions are dispatched from the RS 140 to the execution unit 142. In one embodiment, the execution unit 142 includes an integer execution unit (IEU), a floating point unit (FEU), and a memory execution unit (MEU).

After execution, the instructions are written back to the ROB 144. In a final pipestage, instructions of the ROB 144 that belong to a properly predicted program path are retired and allowed to update an architecturally visible register file (RRF) or allowed to update the external bus 111.

It is appreciated that a number of different pipelined formats may be adopted within the scope of the present invention that may operate within a number of different types of processors.

TRACE BASED MERGING

In order to increase the quality of the re-ordering activity and the resulting schedule, a larger selection of instructions should be provided to the re-order unit 134. A larger selection of instructions can be provided by trace based merging of basic blocks.

The code can be concatenated across branches so as to merge several basic blocks of instructions (BB). More specifically, BB's can be trace-based merged into a hyperblock by determining a trace segment of several BB's, which represents a logical path of execution for a set of BB's. As a result the BB boundaries are eliminated and all of the instructions within the newly formed hyperblock can be re-ordered.

A basic block comprises instructions in a computer program which are unconditionally and consecutively executed. A basic block starts with the first instruction, which either follows a branch instruction or is a target of a branch instruction elsewhere in the program, and ends in a branch instruction. Branch instructions include both unconditional branches (e.g. call, return) and conditional branches. Aside from the final branch instruction, there are no instructions in the basic block which, when executed, may change the control flow in the program.

Figure 2:
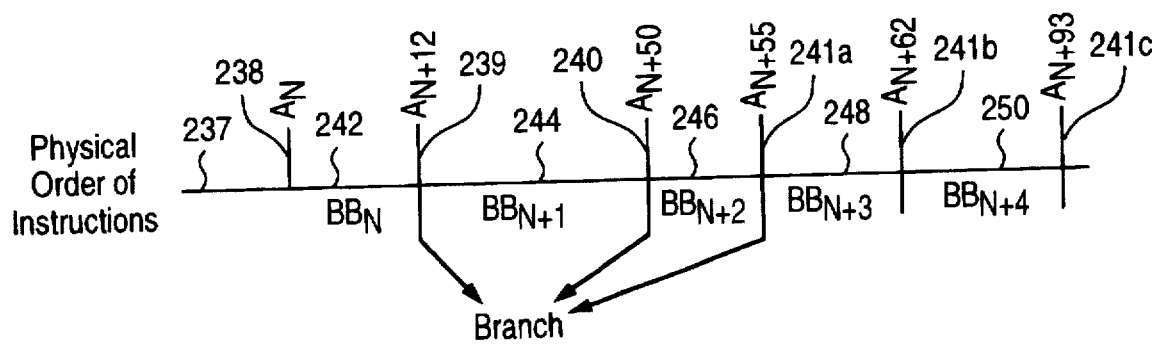
FIG. 2 illustrates a physical sequence of instructions.

In FIG. 2, a static sequence of instructions 237 is illustrated. The instructions are ordered by their virtual addresses. For purposes of discussion, assume that $(A_N)$ 238 is the virtual address for an instruction. Further assume that a plurality of instructions lie between the addresses $(A_N)$ 238 and $(A_{N+12})$ 239 and that these are instructions which will be executed once instruction 238 is executed since they contain no branch instructions. The instruction at the address $(A_{N+12})$ 239, is assumed to be the next branch instruction in the sequence of instructions. Basic block $(BB_N)$ 242 starts with the instruction following instruction 238 and ends with instruction 239. The next branch instruction in the sequence of instructions is instruction 240 at address $A_{N+50}$. Basic block $(BB_{N+1})$ 244 starts with the instructions following instruction 239 and ends with instruction 240. If we assume that branch instructions on the remainder of the static sequence of instructions 237 only occur at $(A_{N+55})$ 241a, $(A_{N+62})$ 241b and $(A_{N+93})$ 241c, then additional basic blocks $(BB_{N+2})$ 246, $(BB_{N+3})$ 248, and $(BB_{N+4})$ 250 are shown.

Figure 3:
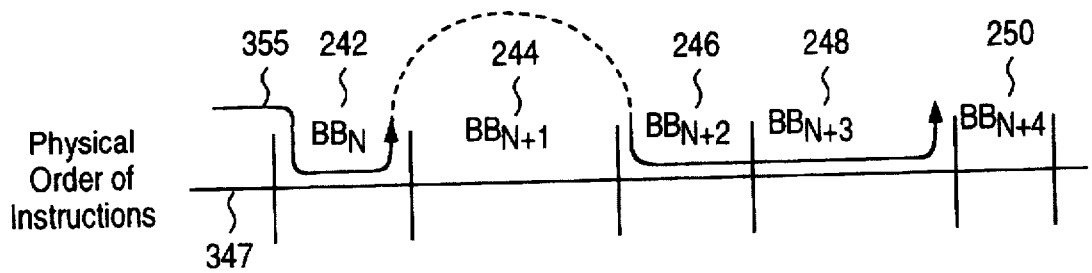
FIG. 3 illustrates a physical sequence of instructions and the control flow changes that occur at branches.

In FIG. 3, the control flow that occurs at branches is illustrated. While it is certain that once the first instruction in a basic block is executed the remaining instructions will be executed, there is no certainty that once, for example, BBN 242 is executed that $BB_{N+1}$ 244 will follow because of the branch instruction between the two basic blocks of instructions.

Trace segment 355 of FIG. 3 shows what may occur in the execution of a typical computer program. If we assume that $(BB_N)$ 242 is executed and at the end of this basic block, a branch is taken to $(BB_{N+2})$ 246, then $(BB_{N+1})$ 244 is skipped. If at the end of $(BB_{N+2})$ 246 a branch is not taken, $(BB_{N+3})$ 248 is executed next. Thus, the order of execution of the basic blocks is not the same as their physical order 347.

The present invention utilizes the trace segments to merge the basic blocks of instructions (BB) into a hyperblock of instructions in an expected logical order of execution. The hyperblock of instructions may then be presented to the re-order unit 134 to improve the quality of the re-ordering.

RE-ORDER UNIT

As previously described, a re-order unit 134 is provided in the microprocessor 112 to re-order instructions prior to loading the re-ordered instruction cache which is the starting point of the execution pipeline.

The re-ordering unit 134 addresses two concerns. A first concern involves accommodating data dependencies by separating dependent instructions to minimize the scheduling opportunities lost because of data dependencies. The instructions are re-ordered so that the largest number of data independent instructions can be scheduled. In addition, the instructions may be re-ordered according to the specific execution latency of the producing instructions to further optimize the re-ordering process. For example: if instruction B is dependent on instruction A, the latency of A is 3 cycles, and the issue width is 4, the re-ordering logic will attempt to find 8 (2 cycles worth of issue) instructions not dependent on A, and re-order them around instruction B so that in the re-ordered instruction stream they fit between instructions A and B.

A second concern involves separating instructions that compete for the same execution resource in order to better utilize the execution unit 142 resources. For example, if the original code has a sequence of load instructions, and not all units of the processor's 112 execution units can perform load operations, the code will be re-ordered so that instructions that can utilize other execution resources are interspersed in between the sequence of loads.

Figure 4:
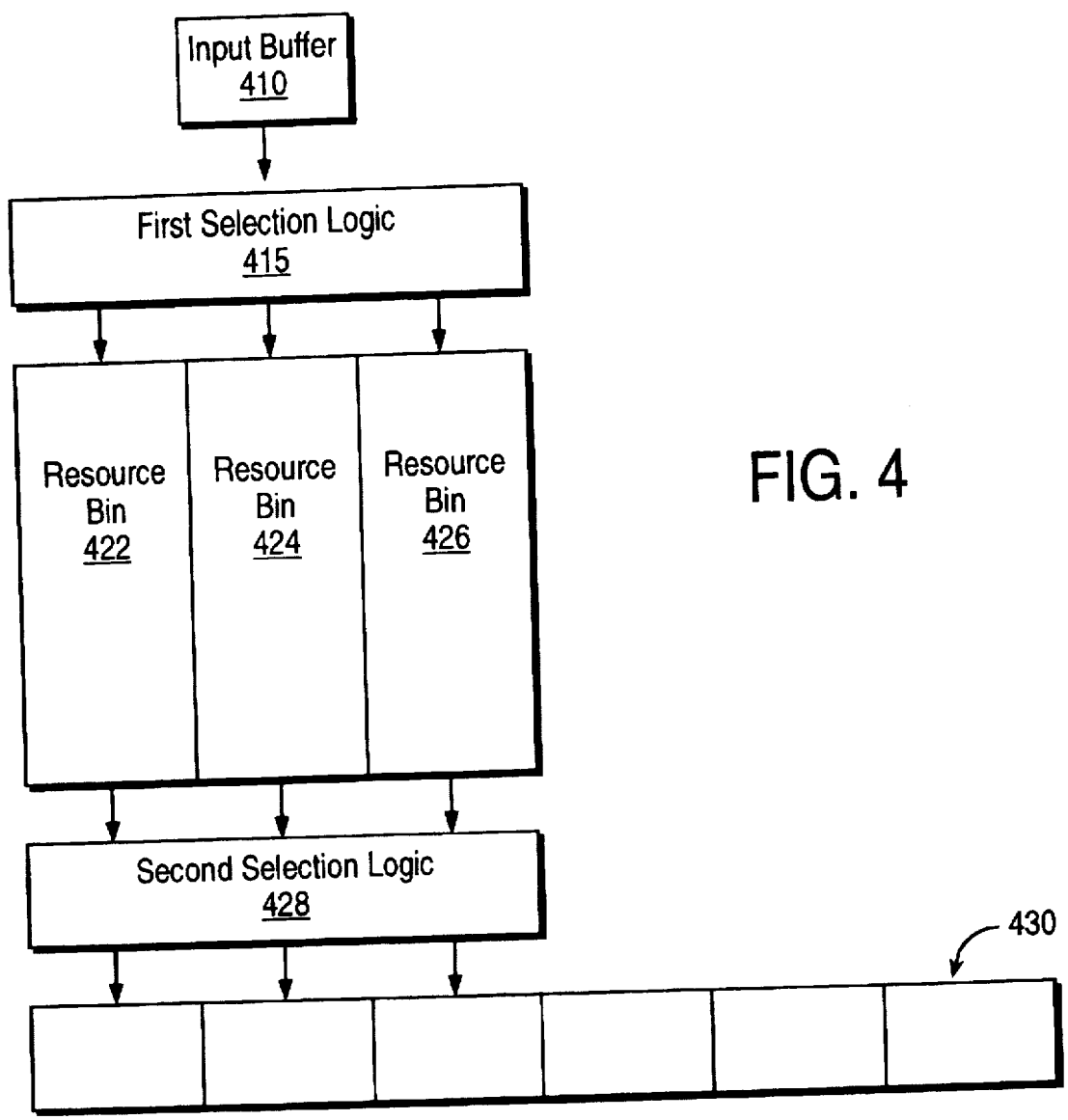
FIG. 4 illustrates a re-order unit of one embodiment of the present invention.

In FIG. 4, an overview of one embodiment of a re-order unit 134 is illustrated. The re-order unit 134 includes an input buffer 410 which receives in-order instructions from memory 114. A first selection logic 415 channels the instructions from the input buffer 410 to separate resource bins 422–426 based on the execution resources needed by the individual instructions. Once the instructions are channeled into the resource bins 422–426, a second selection logic 428 takes the instructions out of the bins based on data dependencies. During each clock cycle an instruction is taken from each bin in accordance with the second selection logic and sent to shift register 430 for assembling cache lines in the re-ordered instruction cache 136.

In one embodiment, the in-order instruction stream entered into the buffer 410 has already been renamed, and all the output and anti dependencies have been eliminated. This embodiment only accommodates resource conflicts. As a result, the second selection phase, of this embodiment, can be done without regard to data dependencies. This assumes that there exists a scoreboarding logic in the processor 112, and instructions are scheduled only when their resources become valid. The second selection logic takes the first instruction from the bottom of each bin, in other words the oldest instruction in each bin. As a result, deadlock situations are avoided where an instruction producing a given register arrives at a given resource after an instruction consuming that register which needs the same execution resource.

In a second embodiment, data dependencies are resolved by maintaining a table for all registers, wherein the table contains a valid bit for each register. When an instruction is taken out of the bin, the destination registers for the instructions results are immediately marked valid, regardless of when the instruction is actually executed or how long it takes to execute. As a result, instructions are only taken out of the bin if their source registers have a valid bit in the table. Even though the data dependency logic does not ensure that instructions will have their data ready when they reach execution, it does ensure that instructions consuming a data will not be issued prior to the instruction producing the data.

In a third embodiment, the scheme of the second embodiment is modified so that the registers written by an instruction removed from a bin only become valid after the latency associated with the operation performed by that instruction. As a result, the re-ordering has a much higher chance of being the correct ordering for execution.

In effect, the second selection phase of the re-ordering unit, bundles the independent instructions that are issued from the resource bins 422–426 into shift register 430. Under all the above embodiments, however, a question arises as to what to do when a resource bin does not have instructions eligible for removal (i.e. none of the instructions satisfy the data dependency constraints of the specific embodiment). Two embodiments are provided to resolve this aspect of the re-ordering process.

In a first embodiment, the second selection phase inserts "no operation codes" (nops) into the instruction stream in place of an instruction, creating fixed length bundles. However, this increases the storage requirements of the re-ordered instruction stream.

In a second embodiment, nops are not used. Variable length bundles are produced by using an additional bit(s) per instruction to mark the end of the bundles. In using the variable length bundles, additional connections are provided between the individual resource bins 422–426 and the shift register 430, so as to allow each bin to provide an instruction into any of the respective input locations of the shift register. For example, as illustrated in FIG. 4, bin 424 needs to be able to insert instructions in both first and second locations, whereas bin 422 needs to be able to insert into all three locations.

From the above description, it will be apparent that the invention disclosed herein provides a novel and advantageous method and apparatus for providing a re-ordered instruction cache in a pipelined microprocessor. As will be understood by those familiar with the art, the invention may be embodied in other specific forms without departing from its essential features, and thus, the described embodiments are not restrictive of the scope of the invention. The following claims are indicative of the scope of the invention, and all variations which come within the meaning and range of equivalency of the claims are to be embraced within their scope.

What is claimed is:

1. A computer implemented method of executing instructions in a pipelined microprocessor, said microprocessor capable of executing instructions out of order, said method comprising the steps of:

fetching a set of instructions from a memory device, said instructions being in-order;

decoding said set of instructions;

re-ordering said set of instructions prior to loading said instructions into an instruction cache;

loading said set of instructions, re-ordered, into said instruction cache; and issuing, for execution, said set of instructions to an execution pipeline of said pipelined processor.

2. The method of claim 1, wherein the step of re-ordering includes separating inter-dependent instructions and re-ordering said instructions to have independent instructions adjacent in an instruction stream.

3. The method of claim 2, wherein the step of re-ordering said set of instructions includes accommodating execution latencies of said set of instructions.

4. The method of claim 3, wherein the step of re-ordering said set of instructions includes:

a) generating a table of instruction result destinations, wherein the results of instructions represent source operands of other instructions;

b) marking valid an instruction result destination of said table when a producing instruction has been issued from a resource bin and after an expected execution latency of said instruction; and c) issuing an instruction from said resource bin when instruction result destinations representing source operands of said instruction are marked valid.

5. The method of claim 2, wherein the step of re-ordering includes the following steps:

a) generating a bundle of instruction s each clock cycle; and b) inserting a no-operation code (nop) in said bundle in place of an instruction when an instruction is unavailable for a clock cycle.

6. The method of claim 2, wherein the step of re-ordering further includes the steps of:

a) generating a variable length bundle of instructions each clock cycle; and b) marking an end of said bundles.

7. The method of claim 2, wherein the step of fetching said set of instructions further includes the step of:

a) fetching a trace segment comprising of a set of basic blocks of instructions in a logical order of execution.

8. The method of claim 1, wherein the step of re-ordering said set of instructions includes balancing a demand for execution resources of said processor.

9. The method of claim 8, wherein the step of re-ordering said set of instructions includes loading said instructions in separate resource bins based on execution resource needs of an instruction.

10. The method of claim 9, wherein the step of re-ordering said set of instructions further includes:

a) generating a table of instruction result destinations, wherein the results of instructions represent source operands of other instructions;

b) marking valid an instruction result destination of said table when a producing instruction has been issued from a resource bin; and c) issuing an instruction from said resource bin when instruction result destinations representing source operands of said instruction are marked valid.

11. The method of claim 9, wherein the instructions loaded in said resource bins are issued when an instruction is independent of unissued instructions.

12. The method of claim 9, wherein the step of re-ordering includes the following steps:

a) generating a bundle of instructions each clock cycle; and b) issuing a no-operation code (NOP) in said bundle in place of an instruction when an instruction is unavailable from a resource bin for a clock cycle.

13. The method of claim 9, wherein the step of re-ordering further includes the steps of:

a) generating a variable length bundle of instructions by issuing an instruction from each resource bin each clock cycle; and b) marking an end of said bundles.

14. The method of claim 8, wherein the step of fetching said set of instructions further includes the step of:

fetching a trace segment comprising of a set of said basic block of instructions in a logical order of execution.

15. A pipelined processor capable of executing instructions out of order, said processor comprising:

a re-ordering unit, said re-ordering unit to receive a set of instructions in order from a memory device and re-order said set of instructions prior to loading an instruction cache;

said instruction cache coupled to said re-ordering unit, to receive said set of instructions having been re-ordered by said re-order unit; and an execution unit coupled to said instruction cache.

16. The processor of claim 15, wherein said re-ordering unit accommodates execution latencies of said set of instructions.

17. The processor of claim 16, wherein said re-ordering unit separates interdependent instructions and re-orders said instructions to have independent instructions adjacent in an instruction stream.

18. The processor of claim 17, wherein said re-ordering unit performs the steps of:

a) generating a table of instruction result destinations, wherein the results of instructions represent source operands of other instructions;

b) marking valid an instruction result destination of said table when a producing instruction has been issued from a resource bin and after an expected execution latency of said instruction; and c) issuing an instruction from said resource bin when instruction result destinations representing source operands of said instruction are marked valid.

19. The processor of claim 15, wherein said re-ordering unit performs the steps of:

a) generating a bundle of instructions each clock cycle; and b) inserting a no-operation code (NOP) in said bundle in place of an instruction when an instruction is unavailable for a clock cycle.

20. The processor of claim 15, wherein said re-ordering unit performs the steps of:

a) generating a variable length bundle of instructions each clock cycle; and b) marking an end of said bundles.

21. The processor of claim 15, wherein said re-ordering unit receives a trace segment comprising of a set of basic blocks of instructions in a logical order of execution.

22. The processor of claim 15, wherein said re-ordering unit accommodates a demand for execution resources of said processor.

23. The processor of claim 22, wherein said re-ordering unit further includes a set of resource bins, wherein said instructions are loaded in separate resource bins based on execution resource needs of an instruction.

24. The processor of claim 23, wherein said reordering unit performs the steps of:

a) generating a table of instruction result destinations, wherein the results of instructions represent source operands of other instructions;

b) marking valid an instruction result destination of said table when a producing instruction has been issued from a resource bin; and c) issuing an instruction from said resource bin when instruction result destinations representing source operands of said instruction are marked valid.

25. The processor of claim 23, wherein said instructions loaded in said resource bins are issued when an instruction is independent of unissued instructions.

26. The processor of claim 23, wherein said re-ordering unit performs the steps of:

a) generating a bundle of instructions each clock cycle; and b) issuing a no-operation code (NOP) in said bundle in place of an instruction when an instruction is unavailable from a resource bin for a clock cycle.

27. The processor of claim 23, wherein said re-ordering unit performs the steps of:

a) generating a variable length bundle of instructions by issuing an instruction from each resource bin each clock cycle; and b) marking an end of said bundles.

28. The processor of claim 22, wherein said re-ordering unit receives a trace segment comprising of a set of basic blocks of instructions in a logical order of execution.

29. A method for executing a plurality of instructions in a computer system, said computer system having a processor capable of executing instructions out of order, said method comprising the steps of:

a) performing an instruction memory lockup to fetch a set instructions, in order, from a memory device;

b) decoding said set of instructions;

c) reordering said set instructions, prior to loading said instructions into an instruction cache, to accommodate execution latencies of said set of instructions and balance a demand for execution resources of said processor;

d) loading said set of instructions, re-ordered, into said instruction cache; and e) executing said instructions, wherein the step of executing includes the steps of:

e1) scheduling and dispatching for execution each of the instructions in response to said instructions being data ready;

e2) executing each instruction; and e3) writing back results from execution wherein the steps of scheduling, dispatching, executing and writing back are performed in consecutive stages of said processor.

* * * * *